United States Patent
Shabani et al.

(10) Patent No.: US 12,219,304 B2
(45) Date of Patent: Feb. 4, 2025

(54) PACKET SWITCHED QUANTUM NETWORK

(71) Applicant: Cisco Technology, Inc., San Jose, CA (US)

(72) Inventors: Alireza Shabani, Los Angeles, CA (US); Bing Qi, Knoxville, TN (US); Stephen Magno DiAdamo, Munich (DE); Glen W. Miller, Haverhill, MA (US); Ramana Rao Venkata Renuka Kompella, Foster City, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 168 days.

(21) Appl. No.: 17/975,175

(22) Filed: Oct. 27, 2022

(65) Prior Publication Data

US 2024/0147101 A1 May 2, 2024

(51) Int. Cl.
*H04B 10/70* (2013.01)
*H04Q 11/00* (2006.01)

(52) U.S. Cl.
CPC ......... *H04Q 11/0003* (2013.01); *H04B 10/70* (2013.01); *H04Q 11/0005* (2013.01); *H04Q 2011/0037* (2013.01)

(58) Field of Classification Search
None
See application file for complete search history.

(56) References Cited

U.S. PATENT DOCUMENTS

| | | | |
|---|---|---|---|
| 2003/0133641 A1* | 7/2003 | Yoo | H04Q 11/0005 385/14 |
| 2005/0047392 A1* | 3/2005 | Ashwood Smith | H04Q 11/0066 370/395.5 |
| 2008/0137858 A1 | 6/2008 | Gelfond et al. | |
| 2016/0218867 A1 | 7/2016 | Nordholt et al. | |
| 2020/0128063 A1 | 4/2020 | Griffin et al. | |
| 2022/0382605 A1* | 12/2022 | Griffin | G06F 9/5044 |
| 2023/0385683 A1* | 11/2023 | Yoo | G06N 10/20 |
| 2024/0062091 A1* | 2/2024 | Brown | G06N 10/00 |

FOREIGN PATENT DOCUMENTS

| | | |
|---|---|---|
| CN | 107579820 A | 1/2018 |
| WO | WO-2020210780 A1 * | 10/2020 |
| WO | 2022094268 A1 | 5/2022 |

OTHER PUBLICATIONS

Singh et al: "Experimental Demonstration of Correlation between Copropagating Quantum and Classical Bits for Quantum Wrapper Networking", ECOC, Sep. 18-22, 2022, paper Tu3B.3 (Year: 2022).*

(Continued)

*Primary Examiner* — Li Liu
(74) *Attorney, Agent, or Firm* — Edell, Shapiro & Finnan, LLC (57) ABSTRACT

A network element receives a classical header for a quantum payload, and processes the classical header to determine a destination endpoint for the quantum payload. The network element generates a new classical header for the quantum payload based on the destination endpoint. The network element sends the new classical header to a next hop ahead of the quantum payload at a time based on a number of hops between the network element and the destination endpoint.

20 Claims, 6 Drawing Sheets

(56) References Cited

OTHER PUBLICATIONS

DiAdamo, S. et al., "Packet Switching in Quantum Networks: A Path to Quantum Internet," https://www.researchgate.net/publication/360640098_Packet_Switching_in_Quantum_Networks_A_Path_to_Quantum_Internet, May 2022, 14 pages.

Yu, N. et al., "Protocols for Packet Quantum Network Intercommunication," https://ieeexplore.ieee.org/abstract/document/9537628, Sep. 14, 2021, 8 pages.

Wang, et al., "End-to-end Quantum Secured Inter-Domain 5G Service Orchestration Over Dynamically Switched Flex-Grid Optical Networks Enabled by a q-ROADM," Journal of Lightwave Technology, Jan. 2020, 12 pages.

Yoo, "Optical Packet and Burst Switching Technologies for the Future Photonic Internet," Journal of Lightwave Technology, vol. 24, No. 12, Dec. 2006, 25 pages.

\* cited by examiner

PACKET SWITCHED QUANTUM NETWORK

TECHNICAL FIELD

The present disclosure relates to quantum computing and quantum network communication.

BACKGROUND

Quantum computing, networking, and sensing have emerged as frontier technologies for information processing. Quantum computers offer solutions for challenges in physical sciences (e.g., chemistry, material science), as well as solutions for machine learning. Quantum networks enable quantum-secure communication and entanglement-assisted communication. Quantum sensors achieve higher measurement sensitivity than classical sensors. Among quantum information technologies, quantum networking provides opportunities beyond communication and cryptography applications. Quantum networking may enable the development of large-scale quantum computers by interconnecting multiple quantum chips. Additionally, networked quantum sensors that exchange quantum information enable additional gains in sensing power.

DETAILED DESCRIPTION

Overview

A method is provided to enable packet switching of a hybrid packet with a classical header and a quantum payload. The method includes receiving at a network element, a classical header for a quantum payload. The method also includes processing the classical header to determine a destination endpoint for the quantum payload and generating a new classical header for the quantum payload based on the destination endpoint. The method further includes sending the new classical header to a next hop at a time based on a number of hops between the network element and the destination endpoint.

Example Embodiments

Quantum communication systems typically operate on optical networks by distributing entangled states for teleporting quantum states between endpoints. This circuit switching approaching is based on complex quantum repeaters with robust quantum memories and high rates of entanglement generation, which may not scale up easily. Transporting quantum information through a packet switched optical network presents additional challenges due to the inability to amplify or copy data signals containing quantum information without destroying the quantum properties of the data. The techniques presented herein modify the typical link layer and node architecture to accommodate packet switched routing of quantum information.

The techniques described herein enable packet switching in a hybrid classical/quantum network by defining a data frame structure capable of handling a quantum payload. The hybrid frame structure includes a classical header, a quantum payload, and an optional classical trailer. The classical header includes information for routing the quantum payload, as well as information for error mitigation and correction. The classical trailer may indicate the end of the quantum payload signal. The quantum payload encodes one or more qubits in an optical format (e.g., polarization encoding or time-bin encoding) that may be measured by the destination endpoint. Quantum communication systems avoid direct measurement of the quantum payload, allowing the quantum information encoded at the source endpoint to reach the destination endpoint without collapsing into a measured state. The classical header/trailer and the quantum payload may be generated using different photonic sources and multiplexed into a hybrid data frame by using different degrees of freedom of light (e.g., time, wavelength, polarization, spatial mode, etc.). Alternatively, a hybrid quantum/classical transceiver may be reconfigured to transmit classical optical signals or quantum optical signals at different times.

As quantum technology evolves and increases, each network element in a hybrid classical/quantum network may include components of varying capability. In one example, a network element may or may not include a quantum storage device capable of temporarily storing a quantum state. In another example, some network elements may include quantum processors that enable error correction for the quantum payload. The techniques presented herein enable the capability of the quantum communication system to improve as the technology of each network element improves.

Figure 1:
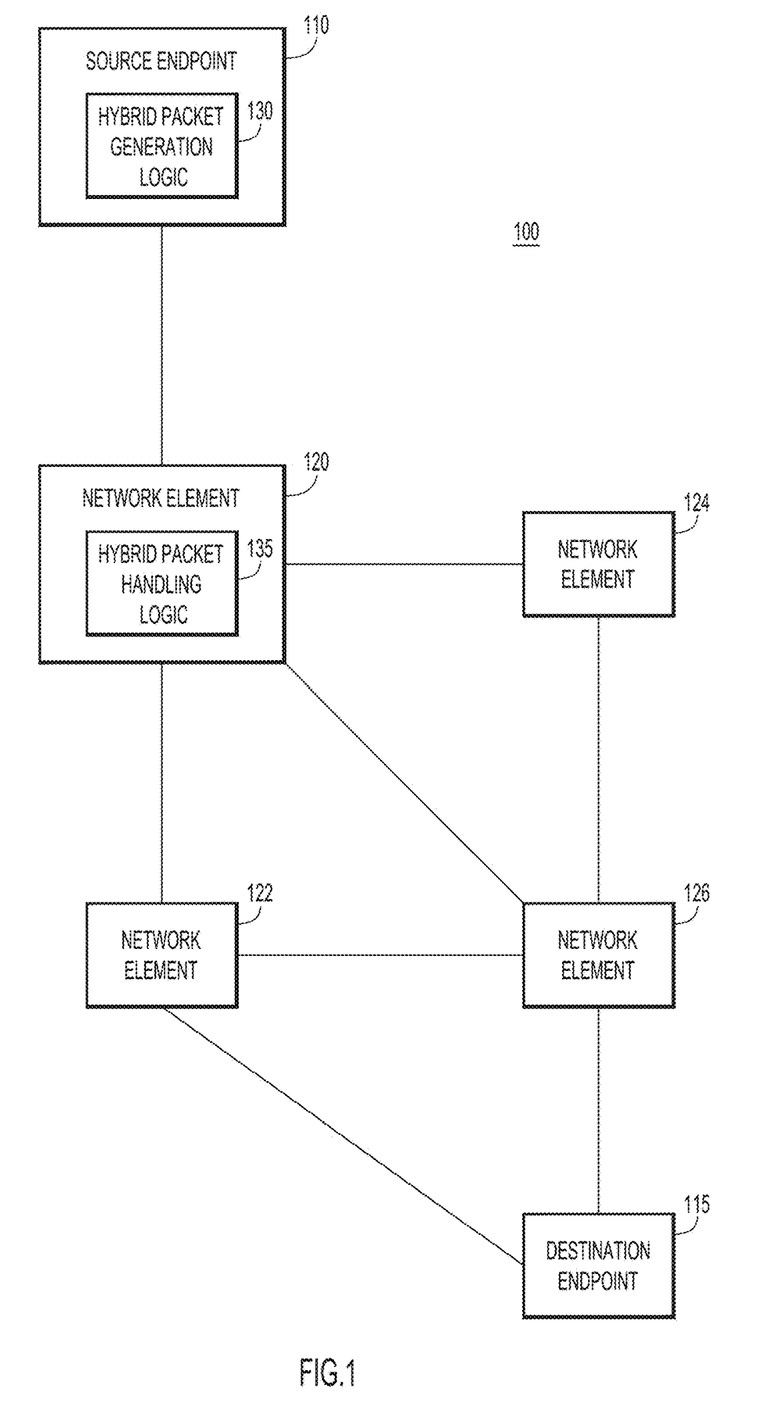
FIG. 1 is simplified block diagram of a quantum networking system between two endpoints, according to an example embodiment.

Referring now to FIG. 1, an example of a packet switched quantum communication system 100 is described. The quantum communication system 100 is configured as a packet switching network that enables a source endpoint 110 to transfer a quantum information state to a destination endpoint 115. The source endpoint 110 is connected to a network element 120, which is connected to network element 122, network element 124, and network element 126. Network element 122 and network element 124 are also connected to the network element 126. Network element 122 and network element 126 are connected to the destination endpoint 115.

The source endpoint 110 includes hybrid packet generation logic 130 that enables the source endpoint 110 to generate hybrid packets/frames comprising a classical header and a quantum payload. The destination endpoint 115 may include similar logic to enable the destination endpoint 115 to serve as a source endpoint for other communication sessions. The network element 120 includes a hybrid packet handling logic 135 that enables the network element 120 to send and receive hybrid packets in the quantum communication system 100. The network elements 122, 124, and 126 also include similar logic to enable each respective network element to handle hybrid classical/quantum packets.

Figure 2:
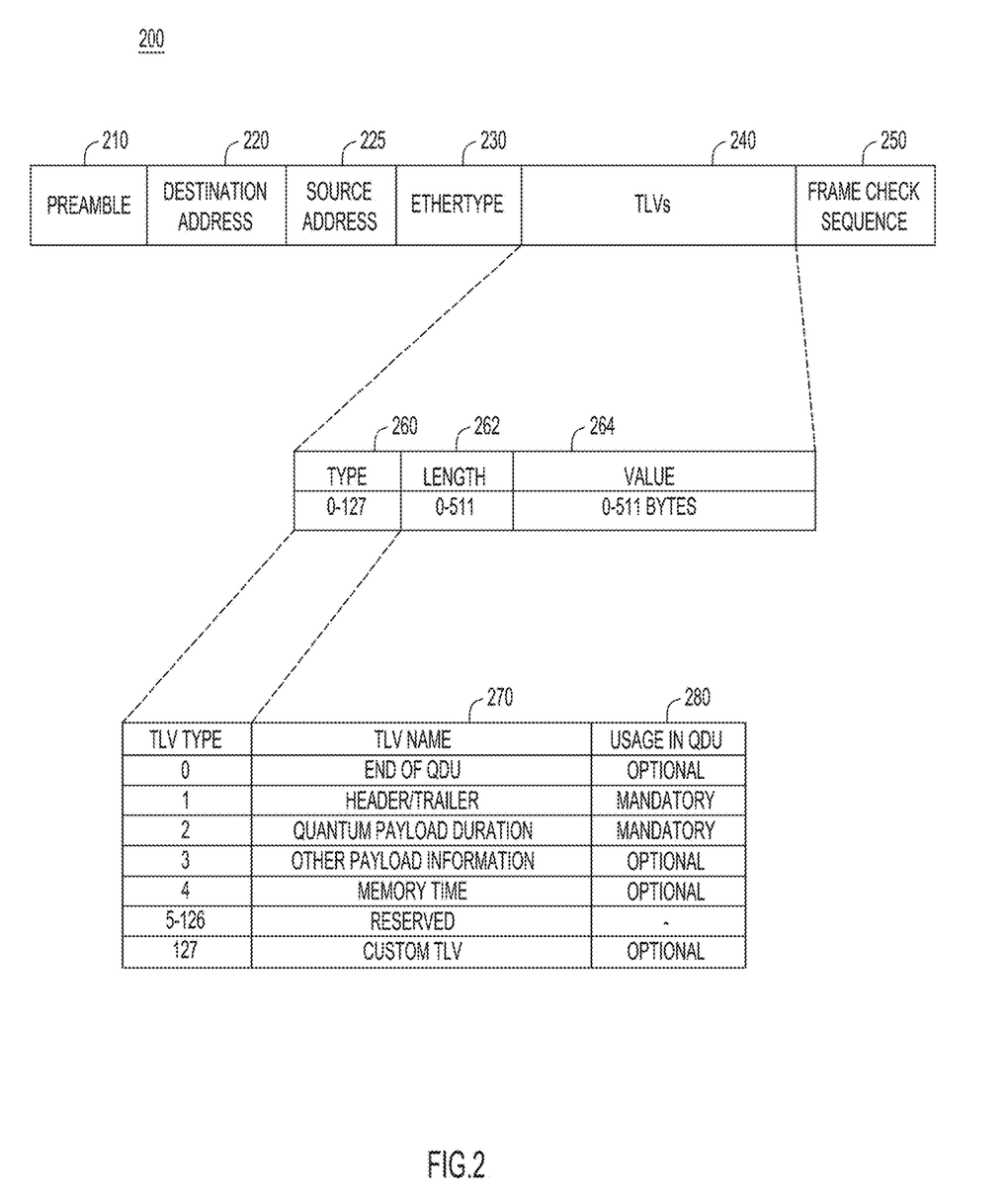
FIG. 2 illustrates a format for a quantum networking frame, according to an example embodiment.

Referring now to FIG. 2, an example of a classical header/trailer 200 is shown for the hybrid frame structure with a Quantum Data Unit (QDU). The classical header/trailer 200 adapts the typical Link Layer Discover Protocol (LLDP) structure to accommodate quantum data transmission.

The classical header/trailer 200 includes a preamble 210 that prepares a receiver to decode the classical header/trailer 200. In one example, the preamble includes synchronization symbols that provide the receiver with bit-level clock synchronization. After the preamble 210 the classical header/trailer 200 includes a destination address 220 and a source address 225. In one example, the destination address 220 and the source address 225 may be Media Access Control (MAC) addresses.

The classical header/trailer 200 may include an Ethertype field 230 that may signal the size of the payload and/or a protocol for encoding the payload. Following the Ethertype field 230, the classical header/trailer 200 includes one or more Type-Length-Value (TLV) 240 that may include information about the hybrid frame. The classical header/trailer 200 ends with a Frame Check Sequence (FCS) field 250 that provides error checking for the classical header/trailer 200. In one example, the FCS field 250 may include a Cyclic Redundancy Check (CRC) to verify the accuracy of the classical header/trailer 200 that is received at the destination.

Each TLV 240 includes a type field 260, and length field 262 and a value field 264. In one example, the type field 260 includes seven bits of information encoding a number from 0-127. The length field 262 may include nine bits of information encoding a number from 0-511. The value field 264 includes a number of bytes of information equal to the number encoded in the length field 262.

The number encoded in the type field 260 of a TLV 240 is associated with a TLV name 270 and usage 280. The TLV name 270 of each TLV type describes the type of information about the hybrid frame that is encoded in the value field 264 of the TLV 240. The usage 280 for each TLV type describes whether the TLV is mandatory or optional. In one example, the TLV type 0 may be associated with the end of the QDU and is an optional TLV 240. In another example, the TLV type 1 may be used to signal whether the classical header/trailer 200 is a header or a trailer and is mandatory. For instance, a value of 1 signals that the classical header/trailer 200 is a header and a value of 0 signals that the classical header/trailer 200 is a trailer. A classical trailer 200 may simply indicate the end of the quantum payload without additional information. Alternatively, a classical trailer 200 may incorporate additional resources for quantum channel estimation or other error correction information.

In a further example, the TLV type 2 may be associated with a duration of the quantum payload and is mandatory. For instance, a TLV 240 with a type field 260 encoding type 2 may include a value field 264 that encodes the length of the quantum payload associated with the classical header/trailer 200 to prevent the receiver of the classical header/trailer 200 from measuring the associated quantum payload and collapsing the quantum state. Additionally, the TLV type 3 may be associated with other information about the quantum payload and is optional. A TLV 240 with a type field 260 encoding type 3 may include a value field 264 that encodes additional information about the quantum payload. For instance, a type 3 TLV 240 may be used to encode the delay time between a classical header and the quantum payload. Additionally, a type 3 TLV 240 may be used to encode the orthogonal basis set for the quantum payload (e.g., polarization or time bin encoding).

In still another example, the TLV type 4 may be associated with a memory time of the quantum payload and is optional. For instance, a TLV 240 with a type field encoding type 4 may include a value field 264 that encodes the length of time that the quantum payload has been stored in a quantum memory. Storing the quantum payload in a quantum memory may increase the likelihood of the quantum payload decohering. A receiver that processes a classical header/trailer 200 with a TLV 240 indicating a memory time higher than a predetermined length of time associated with decoherence in the quantum communication system may drop the entire hybrid frame on the assumption that the quantum payload has decohered. Other information encoded in a type 4 TLV 240 may include a maximum cut-off time until the hybrid frame is dropped or which quantum error correction protocols to use. Additionally, other TLV types may be reserved for future use or associated with a custom TLV.

Currently, quantum memories available for quantum network typically maintain the fidelity of quantum states for a period of time on the order of milliseconds. The techniques presented with respect to FIG. 3 with reference to the quantum communication system 100 from FIG. 1 provide an initial implementation stage of a quantum network that does not require the network elements to have any quantum memory.

Initially, the source endpoint 110 transmits a classical header 310 to the network element 120 to which the source endpoint 110 is connected. The classical header 310 includes information on the destination endpoint 115 that allows the network element 120 to determine a network path from the network element 120 to the destination endpoint 115. After a guard time 315, the source endpoint 110 transmits the quantum payload 320 to the network element 120. The source endpoint 110 may send a classical trailer after the quantum payload 320, but that classical trailer is not shown in FIG. 3 for simplicity.

Figure 3:
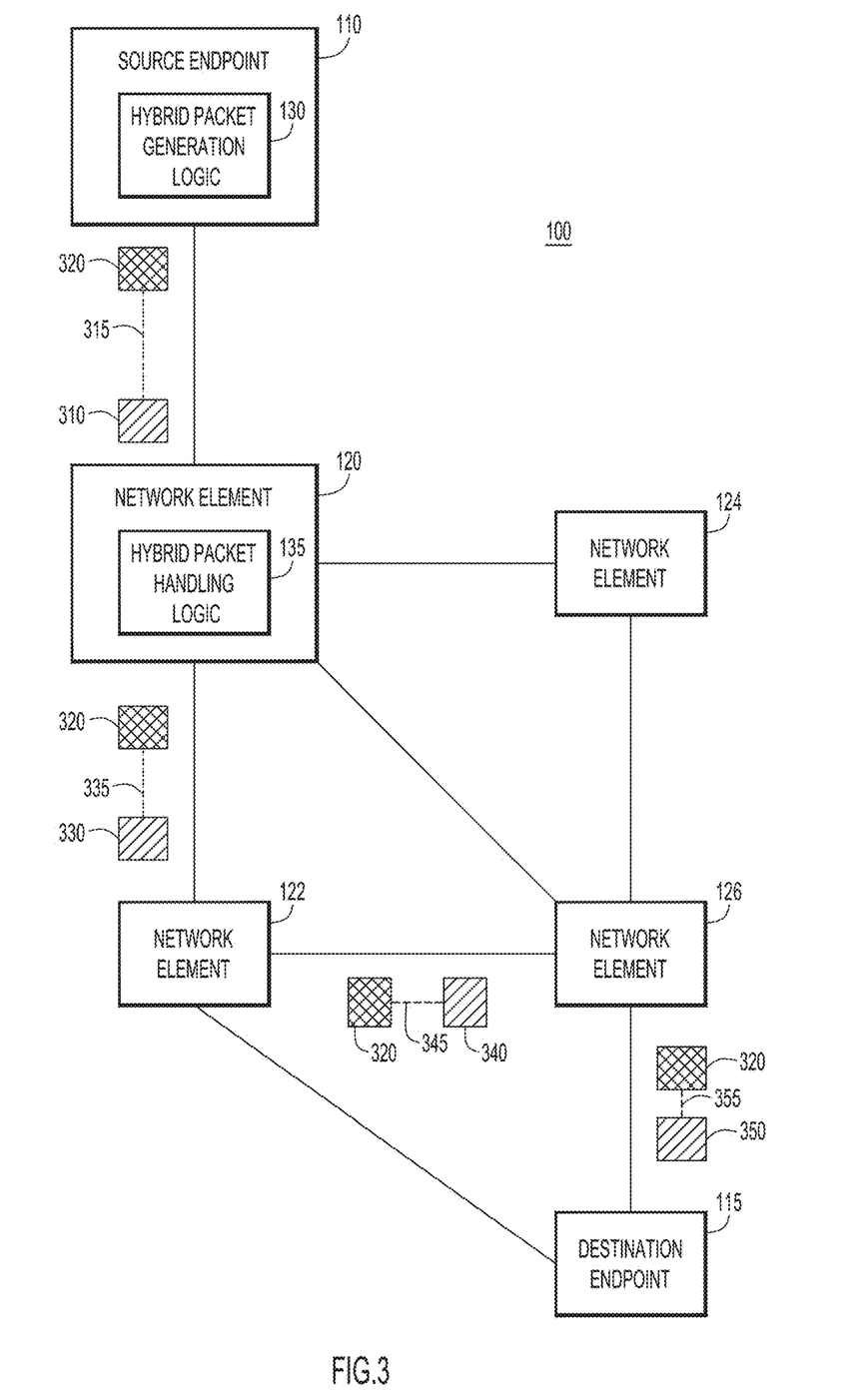
FIG. 3 is a simplified block diagram of a quantum networking system operating in a burst mode, according to an example embodiment.

When the network element 120 receives the classical header 310, the network element processes the classical header 310 to determine the next hop along the network path to the destination endpoint 115. In one example, the network element 120 determines the next hop based on an address for the destination endpoint 115. In another example, the network element 120 may determine the number of hops between the network element 120 and the destination endpoint 115, as well as an estimate of an amount of time each hop in the network path may require to process classical headers. In a further example, the network element 120 may receive an indication of the guard time 315 from processing the classical header 310.

The network element 120 determines that the network element 122 is the next hop in the network path to the destination endpoint 115, generates a new classical header 330, and sends the new classical header 330 to the network element 122. After a guard time 335, the network element 120 forwards the quantum payload 320 to the network element 122 without measuring the quantum payload 320. In one example, the guard time 335 is shorter than the guard time 315 due to the time spent by the network element 120 in processing the classical header 310. In another example, the new classical header 330 may include the same information as the classical header 310. The new classical header 330 may include additional information, such as an indication of the guard time 335.

When the network element 122 receives the classical header 330, the network element 122 processes the classical header 330 to determine the next hop along the network path to the destination endpoint 115. In one example, the network element 122 may determine the next hop based on an address for the destination endpoint 115 in the classical header 330. Additionally, the network element 122 may select the next hop based on network conditions. For instance, if the direct link between the network element 122 and the destination endpoint 115 is congested or otherwise unavailable, the network element 122 may select the network element 126 as the next hop in the network path.

The network element 122 generates a new classical header 340 and sends the new classical header 340 to the network element 126. After a guard time 345, the network element 122 forwards the quantum payload 320 to the network element 126 without measuring the quantum payload 320. In one example, the guard time 345 is shorter than the guard time 335 due to the time spent by the network element 122 in processing the classical header 330. In another example, the new classical header 340 may include the same information as the classical header 330. The new classical header 340 may include additional information, such as an indication of the guard time 345.

When the network element 126 receives the classical header 340, the network element 126 processes the classical header 340 to determine the next hop along the network path to the destination endpoint 115. In one example, the network element 126 may determine that the next hop is the destination endpoint 115. The network element 126 generates a new classical header 350 and sends the new classical header 350 to the destination endpoint 115. After a guard time 355, the network element 126 forwards the quantum payload 320 to the destination endpoint 115 without measuring the quantum payload 320. In one example, the guard time 355 is shorter than the guard time 345 due to the time spent by the network element 126 in processing the classical header 340. In another example, the guard time 355 may be minimized since the next hop in the final hop in the network path.

In one example, the source endpoint 110 adds a long enough guard time to allow each hop along the network path sufficient time to process the classical header (e.g., parse the classical header, make a routing decision, and generate a new classical header) before the quantum payload 320 arrives. If the classical header processing is complete by the time the quantum payload 320 arrives, each network hop can forward the quantum payload to the next hop. If the classical header processing is not complete, or the network element is not able to handle the hybrid frame, the network element may discard the quantum payload 320 and notify the source endpoint 115 to retransmit the quantum payload 320 with a longer initial guard time 315.

The burst switching techniques illustrated in FIG. 3 represent a hybrid approach between packet switching and circuit switching. The ability for each network element to provide dynamic routing provides an advantage over circuit switching. Additionally, all of the network element along the network path are only reserved for a shorter amount of time (e.g., the amount of time between receiving the classical header and transmitting the quantum payload at that particular network element) in comparison to circuit switching, which reserves all of the network elements for the duration of the transmission through the network path.

If the network elements include the capability to store quantum payloads without collapsing the quantum information, then the communication system may not require a long, precise guard time between the classical header and the quantum payload. As the capability of the quantum storage increases, enabling a longer storage period before decoherence, the network elements may minimize or remove the guard time. If the quantum payload arrives before the classical header has been completely processed, the network element may simply store the quantum payload in a quantum memory until the network element is also ready to transmit the new classical header. In this instance, a network element may obtain an optional parameter from the classical header that indicates a maximum storage time for the quantum payload before the hybrid packet should be dropped. If the quantum payload requires a higher fidelity or the maximum duration for storage has elapsed, the quantum payload may be dropped. In each instance, while classical headers and trailers may be amplified, measured, and regenerated at each network element, the quantum payload should be transmitted through the entire network faithfully without being measured or amplified at the intermediary network elements.

Figure 4:
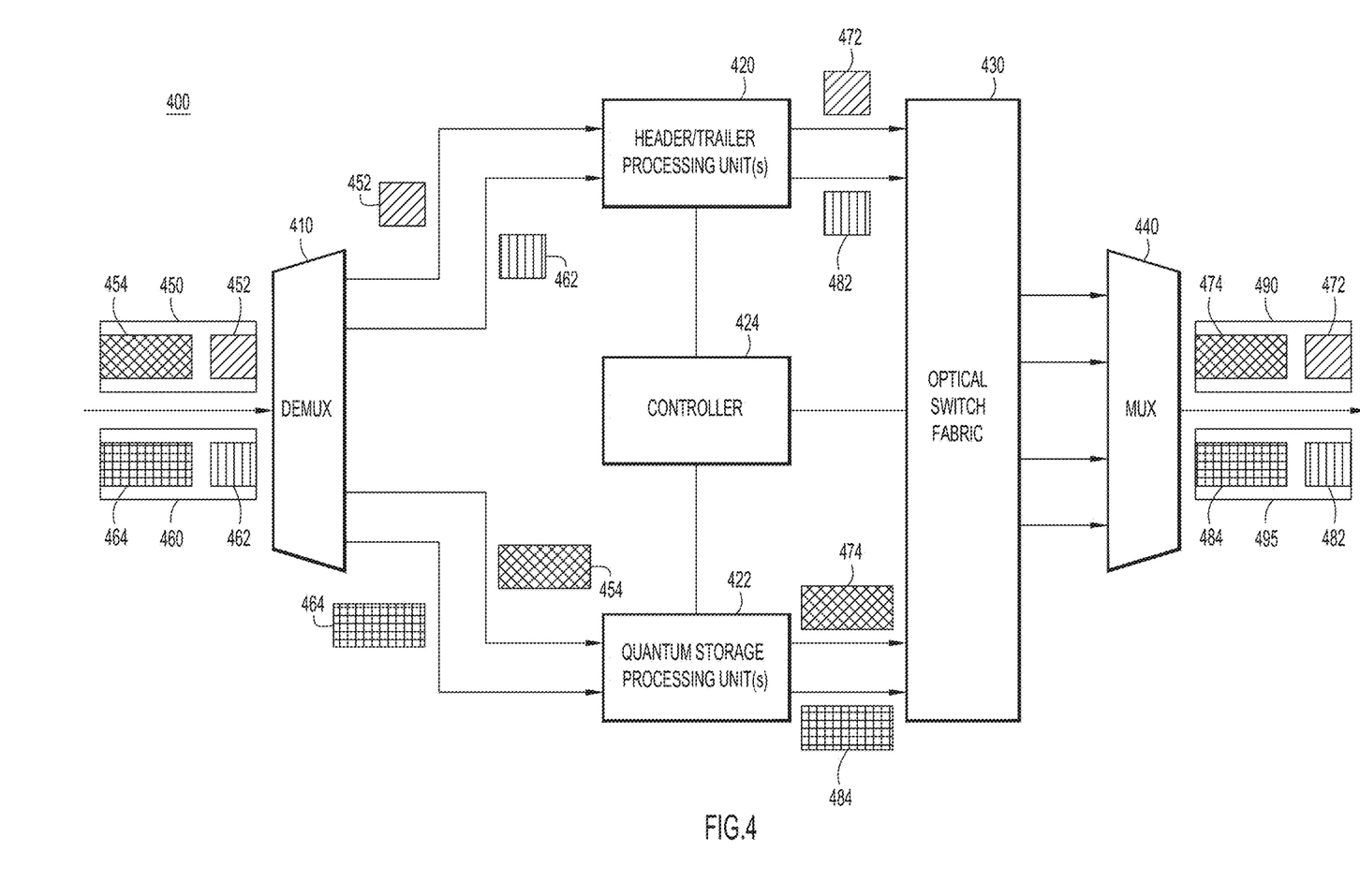
FIG. 4 is a simplified block diagram of a quantum Reconfigurable Optical Add/Drop Multiplexer (q-ROADM), according to an example embodiment.

Referring now to FIG. 4, an example of processing hybrid classical/quantum packets at a network element 400, which includes quantum processing and/or storage, is shown. The network element 400 includes at least one demultiplexer 410, at least one classical header/trailer processing unit 420, at least one quantum storage/processing unit 422, a controller 424, and optical switch fabric 430, and a multiplexer 440. In one example, the demultiplexer 410 may include a plurality of demultiplexers that receive signals from a plurality of input fibers. Similarly, the multiplexer 440 may include a plurality of multiplexers that provide a plurality of output signals to a plurality of output fibers.

In operation, the network element 400 receives a first hybrid packet 450 and a second hybrid packet 460 at the demultiplexer 410. The first hybrid packet 450 includes a first classical header 452 and a first quantum payload 454. The second hybrid packet 460 includes a second classical header 462 and a second quantum payload 464. The demultiplexer 410 separates the first classical header 452 and the second classical header 462 from the first hybrid packet 450 and the second hybrid packet 460, respectively, and sends the first classical header 452 and the second classical header 462 to the header/trailer processing unit 420. The demultiplexer 410 sends the first quantum payload 454 and the second quantum payload 464 to the quantum storage/processing unit 422. In one example, the first quantum payload 454 and the second quantum payload 464 are sent to different quantum storage/processing units 422.

Under the direction of the controller 424, the header/trailer processing unit 420 generates a new first classical header 472 and a new second classical header 482. Similarly, the quantum storage/processing unit 422 may store and/or process the first quantum payload 454 and the second quantum payload 464 to generate a first quantum payload 474 and a second quantum payload 484, respectively. The first classical header 472, second classical header 482, first quantum payload 474 and second quantum payload 484 are directed to the optical switch fabric 430, which is connected to the multiplexer 440. The optical switch fabric 430 may add or drop optical signals to the inputs of the multiplexer 440 under the direction of the controller 424.

The multiplexer 440 groups the first classical header 472 and the first quantum payload 474 into a first hybrid packet 490 and transmits the first hybrid packet to the next hop toward the destination indicated in the first classical header 472. The multiplexer 440 also groups the second classical header 482 and the second quantum payload 484 into a second hybrid packet 495 and transmits the second hybrid packet 495 to the next hop toward the destination indicated in the second classical header 482.

In one example, the network element 400 includes limited quantum processing capability in the quantum storage/processing unit 422 and lacks the capability to perform complicated processing, such as quantum error correction, signal frequency conversion, or other quantum optimizations. In this example, the first quantum payload 454 and the second quantum payload 464 are simply stored in respective quantum memory in the quantum storage/processing unit 422. The quantum memory may be a delay line or a more robust quantum memory. The header/trailer processing unit 420 processes the first classical header 452 and the second classical header 462 to determine an appropriate time to release the first quantum payload 454 and the second quantum payload 464, respectively. In other words, while the classical headers are processed and regenerated, the quantum payloads are stored in a quantum memory. After the classical headers are processed, the quantum payloads are released from the quantum memory with the appropriate timing such that the multiplexer 440 transmit the classical headers ahead of the respective quantum payloads.

In another example, a network element 400 with more developed quantum processing technology may approach the functionality a quantum Reconfigurable Optical Add/Drop Multiplexer (q-ROADM). In this example, the quantum storage/processing unit 422 includes more complex components that enable quantum error correction, signal frequency conversion, and/or additional processing capabilities. Additionally, a network element 400 configured as a q-ROADM may handle multiple users with multiple input fiber, multiple output fibers, and/or add/drop channels, similar to a classical ROADM. Each fiber may carry multiple wavelength channels. Depending on the multiplexing scheme employed by the network element 400, the demultiplexer 410 may use a corresponding demultiplexing scheme to separate the classical header from the quantum payload of incoming hybrid packets.

After the header/trailer processing unit 420 amplifies and converts the classical information into electrical signals, the controller 424 may determine appropriate processing for the corresponding quantum payload. In one example, the quantum payload may be stored in a robust quantum memory while the classical trailer arrives at the network element 400. The controller 424 may direct a quantum processor in the quantum storage/processing unit 422 to perform error correction or other quantum operations on the quantum payload. Based on the state of network traffic the controller 424 may direct the quantum storage/processing unit 422 to release the quantum payload and perform wavelength conversion, if needed.

Figure 5:
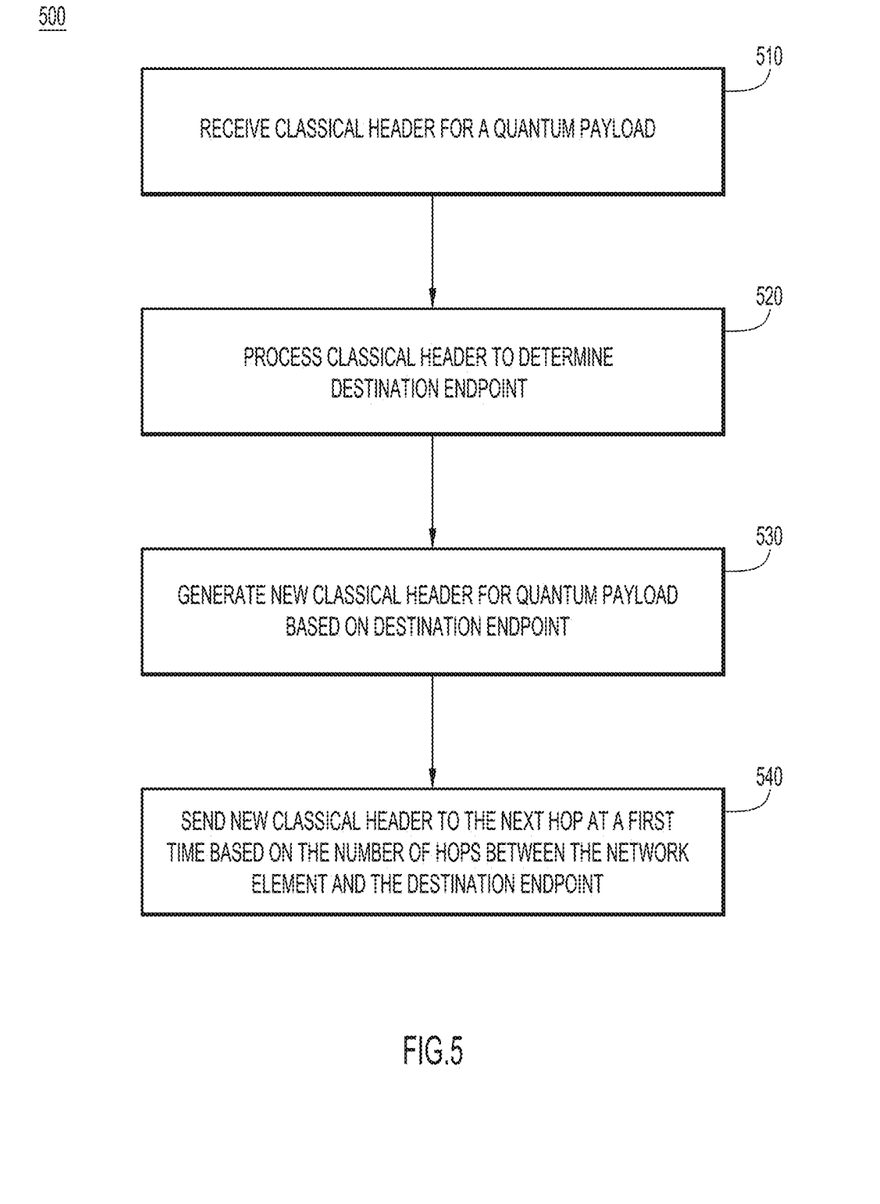
FIG. 5 is a flowchart illustrating operations performed by a hybrid network element to process a networking frame with a classical header and a quantum payload, according to an example embodiment.

Referring now to FIG. 5, a flowchart illustrates an example process 500 performed by a network element (e.g., network element 120) to forward a hybrid packet in a burst mode. At 510, the network element receives a classical header for a quantum payload. In one example, the classical header may include an indication of an incoming guard time period between the reception of the classical header and the reception of the quantum payload.

At 520, the network element processes the classical header to determine a destination endpoint for the quantum payload. In one example, the classical header may include a network address of the destination endpoint. In another example, the network element may determine a network path including a plurality of network hops between the network element and the destination endpoint. In a further example, the network element may determine an incoming guard time period, which provides an indication of when the network element will receive the quantum payload.

At 530, the network element generates a new classical header for the quantum payload based on the destination endpoint. In one example, the new classical header may include an indication of an outgoing guard time period between the transmission of the new classical header and the transmission of the quantum payload. The outgoing guard time period may be determined based on the number of hops between the network element and the destination endpoint to allow each of the subsequent hops time to process the classical header before the quantum payload arrives at that hop.

For instance, the network element may determine how many hops (e.g., three) remain between the network element and the destination endpoint. The network element then allows for a predetermined length of time (e.g., 0.5 milliseconds) for each of the subsequent hops to process the respective classical header, and the network element calculates a total remaining guard time (e.g., 1.5 milliseconds). The network element may then transmit the new classical header before the quantum payload by a length of time at least equal to the total remaining guard time. In this manner the network element transmits the new classical header at a time that is based on the number of hops between the network element and the destination endpoint. The network element may determine when to transmit the new classical header by subtracting the total remaining guard time from the expected arrival time of the quantum payload based on the incoming guard time indicated in the received classical header.

At 540, the network element sends the new classical header to the next hop at a time based on the number of hops between the network element and the destination endpoint. In one example, the time that is based on the number of hops between the network element and the destination endpoint is related to the outgoing guard time period between the network element transmitting the new classical header and transmitting the quantum payload. In another example, the network element may transmit the new classical header before receiving the quantum payload.

Figure 6:
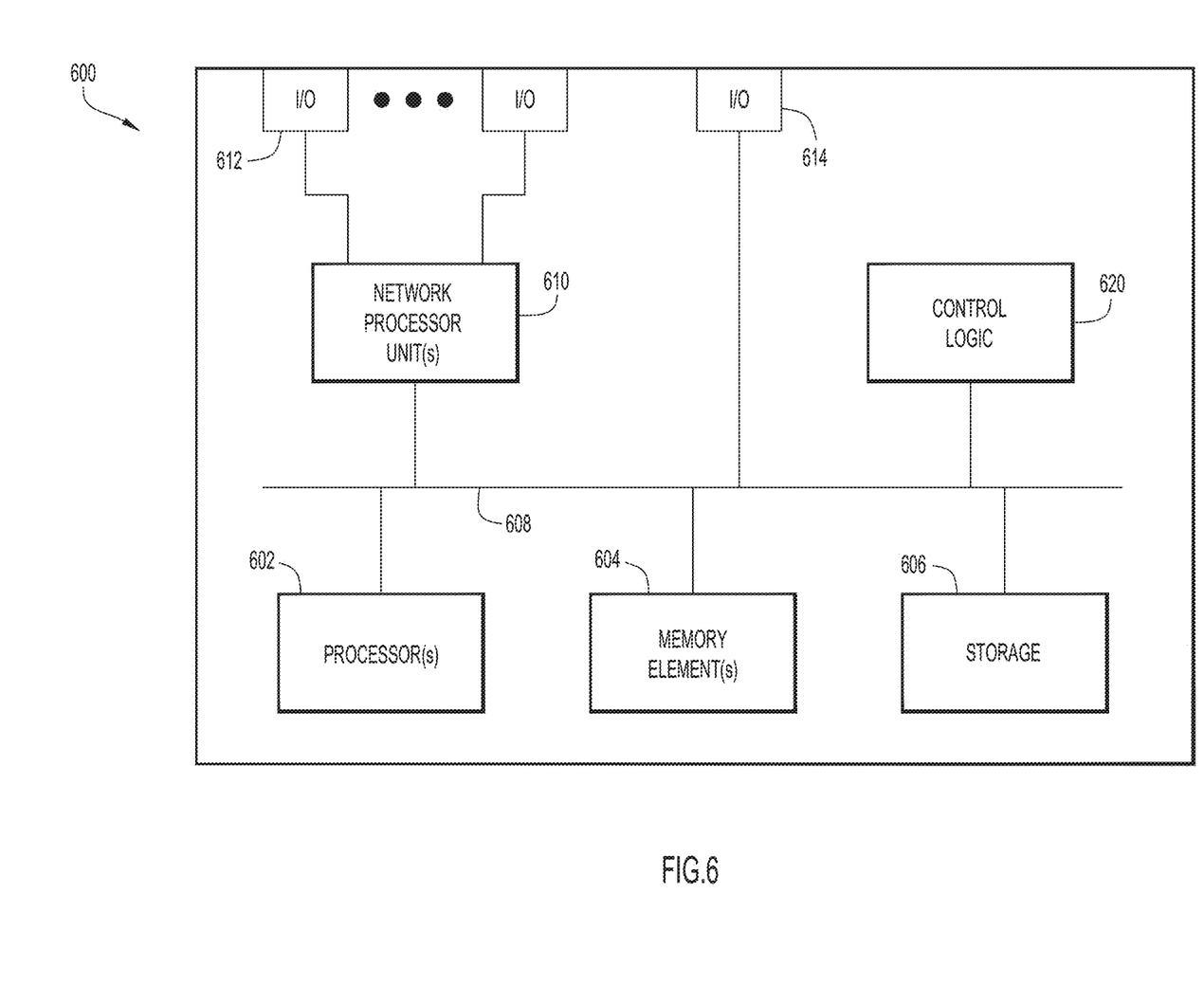
FIG. 6 is a block diagram of a computing device that may be configured to perform the techniques presented herein, according to an example embodiment.

Referring to FIG. 6, FIG. 6 illustrates a hardware block diagram of a computing device 600 that may perform functions associated with operations discussed herein in connection with the techniques depicted in FIGS. 1-5. In various embodiments, a computing device, such as computing device 600 or any combination of computing devices 600, may be configured as any entity/entities as discussed for the techniques depicted in connection with FIGS. 1-5 in order to perform operations of the various techniques discussed herein.

In at least one embodiment, the computing device 600 may include one or more processor(s) 602, one or more memory element(s) 604, storage 606, a bus 608, one or more network processor unit(s) 610 interconnected with one or more network input/output (I/O) interface(s) 612, one or more I/O interface(s) 614, and control logic 620. In various embodiments, instructions associated with logic for computing device 600 can overlap in any manner and are not limited to the specific allocation of instructions and/or operations described herein.

In at least one embodiment, processor(s) 602 is/are at least one hardware processor configured to execute various tasks, operations and/or functions for computing device 600 as described herein according to software and/or instructions configured for computing device 600. Processor(s) 602 (e.g., a hardware processor) can execute any type of instructions associated with data to achieve the operations detailed herein. In one example, processor(s) 602 can transform an element or an article (e.g., data, information, classical bits, qubits) from one state or thing to another state or thing. Any of potential classical processing elements, quantum processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 604 and/or storage 606 is/are configured to store quantum data, classical data, information, software, and/or instructions associated with computing device 600, and/or logic configured for memory element(s) 604 and/or storage 606. For example, any logic described herein (e.g., control logic 620) can, in various embodiments, be stored for computing device 600 using any combination of memory element(s) 604 and/or storage 606. Note that in some embodiments, storage 606 can be consolidated with memory element(s) 604 (or vice versa), or can overlap/exist in any other suitable manner.

In at least one embodiment, bus 608 can be configured as an interface that enables one or more elements of computing device 600 to communicate in order to exchange information and/or data. Bus 608 can be implemented with any architecture designed for passing control, data and/or information between processors, memory elements/storage, peripheral devices, and/or any other hardware and/or software components that may be configured for computing device 600. In at least one embodiment, bus 608 may be implemented as a fast kernel-hosted interconnect, potentially using shared memory between processes (e.g., logic), which can enable efficient communication paths between the processes.

In various embodiments, network processor unit(s) 610 may enable communication between computing device 600 and other systems, entities, etc., via network I/O interface(s) 612 (wired and/or wireless) to facilitate operations discussed for various embodiments described herein. In various embodiments, network processor unit(s) 610 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 600 and other systems, entities, etc. to facilitate operations for various embodiments described herein. In various embodiments, network I/O interface(s) 612 can be configured as one or more Ethernet port(s), Fibre Channel ports, any other I/O port(s), and/or antenna(s)/antenna array(s) now known or hereafter developed. Thus, the network processor unit(s) 610 and/or network I/O interface(s) 612 may include suitable interfaces for receiving, transmitting, and/or otherwise communicating data and/or information in a classical network environment.

I/O interface(s) 614 allow for input and output of data and/or information with other entities that may be connected to computing device 600. For example, I/O interface(s) 614 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 620 can include instructions that, when executed, cause processor(s) 602 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 620) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store classical data/information or quantum data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), light quantum memory, solid quantum memory, etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 604 and/or storage 606 can store data, software, code, instructions (e.g., processor instructions), logic, parameters, combinations thereof, and/or the like used for operations described herein. This includes memory element(s) 604 and/or storage 606 being able to store classical data, quantum data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In summary, the techniques presented herein provide for a packet switching implementation for quantum networking that is scalable as quantum storage and processing technology progresses. Network elements are configured to process the classical information from a hybrid packet comprising a classical header and a quantum payload, to determine that routing of the hybrid packet to a destination endpoint. If the network element is not capable of storing the quantum payload without the quantum information decohering, then the source endpoint transmits the classical header with a sufficient guard time to allow each network element along the network path to the destination endpoint to process the classical header for routing information. As the state of quantum technology improves in the network elements, the guard time may be reduced and the network elements may store and/or perform quantum operations on the quantum payload while the classical header is processed for routing information.

In some aspects, the techniques described herein relate to a method including: receiving at a network element, a classical header for a quantum payload; processing the classical header to determine a destination endpoint for the quantum payload; generating a new classical header for the quantum payload based on the destination endpoint; and sending the new classical header to a next hop at a first time based on a number of hops between the network element and the destination endpoint.

In some aspects, the techniques described herein relate to a method, further including: receiving at the network element, the quantum payload an incoming guard time period after receiving the classical header; and sending the quantum payload to the next hop at a second time that is an outgoing guard time period after the first time, wherein the outgoing guard time period is less than the incoming guard time period.

In some aspects, the techniques described herein relate to a method, further including: receiving at the network element, a classical trailer after the quantum payload, the classical trailer signaling an end of the quantum payload; generating a new classical trailer; and sending the new classical trailer to the next hop after sending the quantum payload to the next hop.

In some aspects, the techniques described herein relate to a method, wherein the classical header includes an indication of the incoming guard time period.

In some aspects, the techniques described herein relate to a method, wherein the new classical header includes an indication of the outgoing guard time period.

In some aspects, the techniques described herein relate to a method, further including: determining whether the incoming guard time period provides sufficient time for the network element to process of the classical header, generate the new classical header, and send the new classical header to the next hop before sending the quantum payload to the next hop; and responsive to a determination that the incoming guard time period does not provide sufficient time, dropping the quantum payload.

In some aspects, the techniques described herein relate to a method, further including notifying a source of the quantum payload that the quantum payload has been dropped.

In some aspects, the techniques described herein relate to an apparatus including: a network interface configured to send and receive optical data; and a processor coupled to the network interface, the processor configured to: receive via the network interface, a classical header for a quantum payload; process the classical header to determine a destination endpoint for the quantum payload; generate a new classical header for the quantum payload based on the destination endpoint; and cause the network interface to send the new classical header to a next hop at a first time based on a number of hops between the apparatus and the destination endpoint.

In some aspects, the techniques described herein relate to an apparatus, wherein the processor is further configured to: receive via the network interface, the quantum payload an incoming guard time period after receiving the classical header; and cause the network interface to send the quantum payload to the next hop at a second time that is an outgoing guard time period after the first time, wherein the outgoing guard time period is less than the incoming guard time period.

In some aspects, the techniques described herein relate to an apparatus, wherein the processor is further configured to: receive via the network interface, a classical trailer after the quantum payload, the classical trailer signaling an end of the quantum payload; generate a new classical trailer; and cause the network interface to send the new classical trailer to the next hop after sending the quantum payload to the next hop.

In some aspects, the techniques described herein relate to an apparatus, wherein the classical header includes an indication of the incoming guard time period.

In some aspects, the techniques described herein relate to an apparatus, wherein the new classical header includes an indication of the outgoing guard time period.

In some aspects, the techniques described herein relate to an apparatus, wherein the processor is further configured to: determine whether the incoming guard time period provides sufficient time for the apparatus to process of the classical header, generate the new classical header, and send the new classical header to the next hop before sending the quantum payload to the next hop; and responsive to a determination that the incoming guard time period does not provide sufficient time, drop the quantum payload.

In some aspects, the techniques described herein relate to an apparatus, wherein the processor is further configured to notify a source of the quantum payload that the quantum payload has been dropped.

In some aspects, the techniques described herein relate to one or more non-transitory computer readable storage media encoded with software including computer executable instructions that, when the software is executed on a network element, is operable to cause a processor of the network element to: receive a classical header for a quantum payload; process the classical header to determine a destination endpoint for the quantum payload; generate a new classical header for the quantum payload based on the destination endpoint; and send the new classical header to a next hop at a first time based on a number of hops between the network element and the destination endpoint.

In some aspects, the techniques described herein relate to one or more non-transitory computer readable storage media, wherein the software is further operable to cause the processor to: receive the quantum payload an incoming guard time period after receiving the classical header; and send the quantum payload to the next hop at a second time that is an outgoing guard time period after the first time, wherein the outgoing guard time period is less than the incoming guard time period.

In some aspects, the techniques described herein relate to one or more non-transitory computer readable storage media, wherein the software is further operable to cause the processor to: receive a classical trailer after the quantum payload, the classical trailer signaling an end of the quantum payload; generate a new classical trailer; and send the new classical trailer to the next hop after sending the quantum payload to the next hop.

In some aspects, the techniques described herein relate to one or more non-transitory computer readable storage media, wherein the classical header includes an indication of the incoming guard time period, and wherein the new classical header includes an indication of the outgoing guard time period.

In some aspects, the techniques described herein relate to one or more non-transitory computer readable storage media, wherein the software is further operable to cause the processor to: determine whether the incoming guard time period provides sufficient time for the network element to process of the classical header, generate the new classical header, and send the new classical header to the next hop before sending the quantum payload to the next hop; and responsive to a determination that the incoming guard time period does not provide sufficient time, drop the quantum payload.

In some aspects, the techniques described herein relate to one or more non-transitory computer readable storage media, wherein the software is further operable to cause the processor to notify a source of the quantum payload that the quantum payload has been dropped.

Each example embodiment disclosed herein has been included to present one or more different features. However, all disclosed example embodiments are designed to work together as part of a single larger system or method. The disclosure explicitly envisions compound embodiments that combine multiple previously-discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   receiving at a network element including a quantum memory, a classical header for a quantum payload;
   processing the classical header to determine a destination endpoint for the quantum payload;
   receiving the quantum payload at the network element and storing the quantum payload in the quantum memory;
   generating a new classical header for the quantum payload based on the destination endpoint, wherein the new classical header includes a length of time the quantum payload is stored in the quantum memory;
   sending the new classical header to a next hop at a first time based on a number of hops between the network element and the destination endpoint; and
   sending the quantum payload to the next hop after the first time for routing to the destination endpoint based on decoherence of the quantum payload indicated by the length of time.

2. The method of claim 1, further comprising:
   receiving at the network element, the quantum payload at an incoming guard time period after receiving the classical header; and
   sending the quantum payload to the next hop at a second time that is an outgoing guard time period after the first time,
   wherein the outgoing guard time period is shorter than the incoming guard time period.

3. The method of claim 2, further comprising:
   receiving at the network element, a classical trailer after the quantum payload, the classical trailer signaling an end of the quantum payload;
   generating a new classical trailer; and
   sending the new classical trailer to the next hop after sending the quantum payload to the next hop.

4. The method of claim 2, wherein the classical header includes an indication of the incoming guard time period.

5. The method of claim 2, wherein the new classical header includes an indication of the outgoing guard time period.

6. The method of claim 2, further comprising:
   determining whether the incoming guard time period provides sufficient time for the network element to process the classical header, generate the new classical header, and send the new classical header to the next hop before sending the quantum payload to the next hop; and
   responsive to a determination that the incoming guard time period does not provide sufficient time, dropping the quantum payload.

7. The method of claim 6, further comprising notifying a source of the quantum payload that the quantum payload has been dropped.

8. An apparatus comprising:
   a network interface configured to send and receive optical data;
   a quantum memory; and
   a processor coupled to the network interface and quantum memory, the processor configured to:
      receive via the network interface, a classical header for a quantum payload;
      process the classical header to determine a destination endpoint for the quantum payload;
      receive the quantum payload via the network interface and store the quantum payload in the quantum memory;
      generate a new classical header for the quantum payload based on the destination endpoint, wherein the new classical header includes a length of time the quantum payload is stored in the quantum memory;
      cause the network interface to send the new classical header to a next hop at a first time based on a number of hops between the apparatus and the destination endpoint; and
      cause the network interface to send the quantum payload to the next hop after the first time for routing to the destination endpoint based on decoherence of the quantum payload indicated by the length of time.

9. The apparatus of claim 8, wherein the processor is further configured to:
   receive via the network interface, the quantum payload at an incoming guard time period after receiving the classical header; and
   cause the network interface to send the quantum payload to the next hop at a second time that is an outgoing guard time period after the first time,
   wherein the outgoing guard time period is shorter than the incoming guard time period.

10. The apparatus of claim 9, wherein the processor is further configured to:
- receive via the network interface, a classical trailer after the quantum payload, the classical trailer signaling an end of the quantum payload;
- generate a new classical trailer; and
- cause the network interface to send the new classical trailer to the next hop after sending the quantum payload to the next hop.

11. The apparatus of claim 9, wherein the classical header includes an indication of the incoming guard time period.

12. The apparatus of claim 9, wherein the new classical header includes an indication of the outgoing guard time period.

13. The apparatus of claim 9, wherein the processor is further configured to:
- determine whether the incoming guard time period provides sufficient time for the apparatus to process the classical header, generate the new classical header, and send the new classical header to the next hop before sending the quantum payload to the next hop; and
- responsive to a determination that the incoming guard time period does not provide sufficient time, drop the quantum payload.

14. The apparatus of claim 13, wherein the processor is further configured to notify a source of the quantum payload that the quantum payload has been dropped.

15. One or more non-transitory computer readable storage media encoded with software comprising computer executable instructions that, when the software is executed on a network element including a quantum memory, is operable to cause a processor of the network element to:
- receive a classical header for a quantum payload;
- process the classical header to determine a destination endpoint for the quantum payload;
- receive the quantum payload and store the quantum payload in the quantum memory;
- generate a new classical header for the quantum payload based on the destination endpoint, wherein the new classical header includes a length of time the quantum payload is stored in the quantum memory;
- send the new classical header to a next hop at a first time based on a number of hops between the network element and the destination endpoint; and
- send the quantum payload to the next hop after the first time for routing to the destination endpoint based on decoherence of the quantum payload indicated by the length of time.

16. The one or more non-transitory computer readable storage media of claim 15, wherein the software is further operable to cause the processor to:
- receive the quantum payload at an incoming guard time period after receiving the classical header; and
- send the quantum payload to the next hop at a second time that is an outgoing guard time period after the first time, wherein the outgoing guard time period is shorter than the incoming guard time period.

17. The one or more non-transitory computer readable storage media of claim 16, wherein the software is further operable to cause the processor to:
- receive a classical trailer after the quantum payload, the classical trailer signaling an end of the quantum payload;
- generate a new classical trailer; and
- send the new classical trailer to the next hop after sending the quantum payload to the next hop.

18. The one or more non-transitory computer readable storage media of claim 16, wherein the classical header includes an indication of the incoming guard time period, and wherein the new classical header includes an indication of the outgoing guard time period.

19. The one or more non-transitory computer readable storage media of claim 16, wherein the software is further operable to cause the processor to:
- determine whether the incoming guard time period provides sufficient time for the network element to process the classical header, generate the new classical header, and send the new classical header to the next hop before sending the quantum payload to the next hop; and
- responsive to a determination that the incoming guard time period does not provide sufficient time, drop the quantum payload.

20. The one or more non-transitory computer readable storage media of claim 19, wherein the software is further operable to cause the processor to notify a source of the quantum payload that the quantum payload has been dropped.

* * * * *